United States Patent
Martinsson

(10) Patent No.: US 8,615,889 B2
(45) Date of Patent: Dec. 31, 2013

(54) ATTACHING ARRANGEMENT FOR HAND-HELD MOTOR-DRIVEN TOOLS

(75) Inventor: Par Martinsson, Jonkoping (SE)

(73) Assignee: Husqvarna AB, Huskvarna (SE)

( * ) Notice: Subject to any disclaimer, the term of this patent is extended or adjusted under 35 U.S.C. 154(b) by 585 days.

(21) Appl. No.: 12/682,765

(22) PCT Filed: Oct. 12, 2007

(86) PCT No.: PCT/SE2007/000895
§ 371 (c)(1),
(2), (4) Date: May 25, 2010

(87) PCT Pub. No.: WO2009/048356
PCT Pub. Date: Apr. 16, 2009

(65) Prior Publication Data
US 2010/0275451 A1    Nov. 4, 2010

(51) Int. Cl.
*B27B 17/02*    (2006.01)
(52) U.S. Cl.
USPC .............................................. 30/383; 403/24
(58) Field of Classification Search
USPC ......... 30/383, 592, 386, 381; 125/21; 403/24; 411/10, 113, 386, 427, 533, 999; 470/18; 280/728.2
See application file for complete search history.

(56) References Cited

U.S. PATENT DOCUMENTS

| | | | |
|---|---|---|---|
| 4,219,064 A | 8/1980 | Lozano | |
| 5,039,264 A | 8/1991 | Benn | |
| 5,326,206 A | 7/1994 | Moore | |
| 5,497,557 A | 3/1996 | Martinsson | |
| 6,564,459 B1 | 5/2003 | Steinbrueck | |
| 7,743,513 B1* | 6/2010 | Fisher et al. | 30/386 |
| 2001/0042311 A1 | 11/2001 | Kondo et al. | |
| 2005/0169727 A1 | 8/2005 | Cosenza | |
| 2008/0034597 A1* | 2/2008 | Pfleiderer et al. | 30/382 |
| 2010/0236756 A1 | 9/2010 | Yang | |
| 2011/0232110 A1* | 9/2011 | Wolf et al. | 30/383 |

FOREIGN PATENT DOCUMENTS

DE    29909645 U1    10/1999
GB    2368039 A    4/2002

OTHER PUBLICATIONS

International Search Report; WO2009/048356, Apr. 16, 2009.
Non-Final Office Action received in related U.S. Appl. No. 12/758,290, mailed Jan. 14, 2013.

* cited by examiner

*Primary Examiner* — Ghassem Alie
(74) *Attorney, Agent, or Firm* — Novak Druce Connolly Bove + Quigg LLP

(57) ABSTRACT

The invention relates to an arrangement for attaching a bar of a hand-held motor driven tool to a body of the tool, the arrangement including: at least one bolt, having a first part, securely arranged to the body, and a second part extending from the body, the second part having an engagement portion for engaging a nut; a cover portion adapted to bear against a bar such that the bar is arranged between the cover portion and the body; and at least one nut, captively attached to the cover portion. The nut is adapted to engage the engagement portion of the bolt for securing a bar between the cover portion and the body, the nut having a rotation axis. Thereby, an attachment arrangement is achieved that facilitates changing of bars when the nut used in the attachment arrangement is captively arranged to the cover portion.

16 Claims, 2 Drawing Sheets

ATTACHING ARRANGEMENT FOR HAND-HELD MOTOR-DRIVEN TOOLS

TECHNICAL FIELD

The present invention deals with attaching arrangements for hand-held motor-driven tools, such as chain saws. Especially, the invention deals with arrangements for attaching a bar of such a hand-held motor-driven tool to a body of the tool.

BACKGROUND

A conventional chain saw includes a body and a guide bar that supports the saw chain. A cover clamps the guide bar to the body by means of a tightening arrangement, comprising a bar bolt and a nut. For some reasons, e.g. for changing bars or if the chain has come off, the cover may have to be detached from the body. Before the cover can be detached, the tightening arrangement has to be loosened such that the nut is detached from the bar bolt.

A problem with conventional tightening arrangements, where the nut is loose when detached from the bar bolt, is that an operator of the tool might lose the nut when detaching the cover from the body, especially if situated in a forest. The operator often puts the nut on the ground after detaching it from the bar bolt, and since the ground is usually covered by brushwood and scrub, finding the nut again might be difficult.

An arrangement where the nut is disposed in the interior of the cover, and consequently can't be lost when detaching the cover, is disclosed in US2001/0042311. A disadvantage with this arrangement is that the cover can not be pressed towards the body in order to hold the guide bar in position before starting to thread the nut and the bolt, since the nut will bear against the bolt before the cover bears against the guide bar. Instead the operator has to hold the guide bar in position with one hand while threading the nut with the other hand, which makes the attaching operation complicated.

For large chain saws, having long guide bars, the guide bar tightening arrangement is exposed to greater strain and two bar bolts with corresponding nuts are generally used in order to strengthen the mounting. An arrangement having two bar bolts is disclosed in U.S. Pat. No. 5,497,557. In a chain saw having more than one bar bolt, the arrangement described in US2001/0042311 is not convenient since it would not allow loosening the nuts one at a time. Instead the operator has to unthread the nuts alternately, which makes the detaching of the cover from the body a bit tedious.

There are also other reasons for the operator to detach the cover, not only for the purpose of changing bar or changing chain. For instance, the operator is doing a weekly overhaul that might include inspection of break components and inspection of the centrifugal clutch. The cover needs to be detached during such inspections. A further reason for detaching the cover is for getting access to and cleaning the grove or hole in the bar which provides the chain with chain oil. The groove or hole might become clogged by dirt during long term use in severe operating conditions and is sometimes in need of cleaning.

SUMMARY

It is an object of the present invention to provide an improved solution that alleviates at least some of the mentioned drawbacks with present arrangements.

The object is achieved by an arrangement for attaching a bar of a hand-held motor driven tool, such as a chain saw, to a body of the tool, according to claim 1 of the present invention. The arrangement comprises: at least one first engagement means, having a first part, securely arranged to the body, and a second part extending from the body, the second part having an engagement portion for engaging a second engagement means; a cover portion adapted to bear against a bar such that the bar is arranged between the cover portion and the body; at least one second engagement means, captively attached to the cover portion, wherein the second engagement means is adapted to engage the engagement portion of the first engagement means for securing a bar between the cover portion and the body, the second engagement means having a rotation axis. The second engagement means is arranged to move a first distance (A) along the engagement portion of the first engagement means, in a direction of the rotation axis of the second engagement means, for securing a bar between the cover portion and the body. When the first and second engagement means are not engaged, the second engagement means is captively attached to the cover portion in such a way that it is movable a second distance (B) relative the cover portion in a direction of the rotation axis of the second engagement means, wherein the second distance (B) is larger than the first distance (A).

Preferably, when the first and second engagement means are not engaged and the cover portion is dismounted from the body, the second engagement means is captively attached to the cover portion in such a way that it is movable a second distance (B) relative the cover portion in a direction of the rotation axis of the second engagement means, wherein the second distance (B) is larger than the first distance (A).

By captively attaching the second engagement means to the cover portion in such a way, it is possible for an operator to put the cover portion onto the first engagement means such that the cover portion can be pressed towards the bar for clamping the bar between the cover portion and the body of the tool before the operator starts to engage the second engagement means to the first engagement means. Thereby, mounting the cover portion to the bar is facilitated when a second engagement means captively attached to the cover portion is used. The solution also ensures correct mounting of the cover portion to the body, which is especially crucial if a brake is mounted in the cover portion.

According to an embodiment of the invention, the cover portion has an inner surface that, when the cover portion is arranged to the body, is directed towards the body, and an outer surface that, when the cover portion is arranged to the body, is directed away from the body. The cover portion further has a through aperture extending between the inner and outer surfaces for receiving the second part of the first engagement means. The cover portion further comprises at least one recess in which an attaching portion of the second engagement means is arranged for captively attaching the second engagement means to the cover portion.

By arranging the cover portion with such a recess and such a through aperture, the nut can be captively attached to the cover portion and still have a certain play in the direction of the nut rotation axis, in relation to the cover portion.

According to another embodiment of the invention, the cover portion has guiding means for guiding the first engagement means towards the second engagement means. Thereby, it is facilitated to guide the cover portion correctly onto the first attachment means, since when the first attachment means is inserted into the guiding means the first attachment means is guided towards the second attachment means, whereby a correct arrangement of the cover portion to the body is achieved.

According to yet another embodiment of the invention, at least a part of the through aperture has substantially the same cross-sectional dimension as a cross-sectional dimension of the first engagement means. Thereby, the inner walls of the through aperture functions as a guiding means for guiding the first engagement means towards the second engagement means.

According to an alternative embodiment of the invention, the at least one recess of the cover portion is arranged separately from the through aperture. Thereby, the second distance B, the distance that the second engagement means is movable relative the cover portion can be increased and still it is possible to use the whole length of the through aperture as a guiding means for guiding the first engagement means towards the second engagement means.

According to a variant of this alternative embodiment, the second engagement means comprises a holder portion and an engagement portion, the engagement portion being rotatably attached to the holder portion. Since the engagement portion is rotatably attached to the holder portion, the holder portion can be captively attached to the cover portion without having to be rotatable. Thereby, the cover portion does not have to allow rotational movement of the holder portion in the cover portion, resulting in less free space necessary for the second engagement means in the cover portion.

According to another variant of the same alternative embodiment, at least one attaching portion of the holder portion of the second engagement means has a resilient structure. Thereby, the holder portion can be snap-fitted into the at least one recess of the cover portion, which results in a quick captive mounting of the second engagement means to the cover portion.

According to yet another variant of the same alternative embodiment, the at least one attaching portion comprises at least three attaching portions cooperating with at least three separate recesses of the cover portion. Thereby, a close fit can be achieved between the recesses and the attaching portions of the nuts irrespective of tolerances in construction of cover portions and nuts.

According to another alternative embodiment of the invention, the at least one recess for captively attaching the second engagement means to the cover portion is a part of the through aperture for receiving the first engagement means. Thereby, the manufacture of the cover portion is simplified since recess and through aperture is in the same hole.

According to a variant of this alternative embodiment, the attaching portion of the second engagement means comprises a protrusion extending in a direction away from the rotation axis of the second engagement means, and the cover portion comprises a protrusion extending in a direction towards the rotation axis of the second engagement means, said protrusions being arranged to cooperate such that the second engagement means is captively attached to the cover portion. Thereby, a cost-efficient manner to captively attach the nut to the cover portion is achieved.

According to another variant of this alternative embodiment, the cover portion has a base portion and a plate portion, wherein the plate portion is attached to the base portion by means of an attachment device, and wherein the protrusion of the cover portion is part of the plate portion. Thereby, captively mounting the nut to the cover portion is facilitated. Also, changing a defect nut is facilitated.

According to another embodiment of the invention, the arrangement comprises at least two first engagement means and at least two second engagement means, each of the at least two second engagement means being arranged to cooperate with a respective one of the at least two first engagement means. By using an arrangement according to the invention for a tool having at least two first engagement means with corresponding second engagement means, the user may engage a second engagement means to its corresponding first engagement means fully, before another second engagement means is engaged to its corresponding first engagement means. Thereby, assembling the cover portion to the body is facilitated. Similarly, when disassembling the cover portion from the body, a second engagement means can be disengaged from its first engagement means before the other second engagement means are even loosened from their corresponding first engagement means, which facilitates the disassembling of the cover portion from the body.

According to another aspect of the invention, a hand-held motor-driven tool, such as a chain saw is claimed. The tool comprises a body and a bar and an arrangement according to the present invention.

BRIEF DESCRIPTION OF THE DRAWINGS

The invention will in the following be described in more detail with reference to the enclosed drawings, wherein.

DESCRIPTION OF EMBODIMENTS

Figure 1:
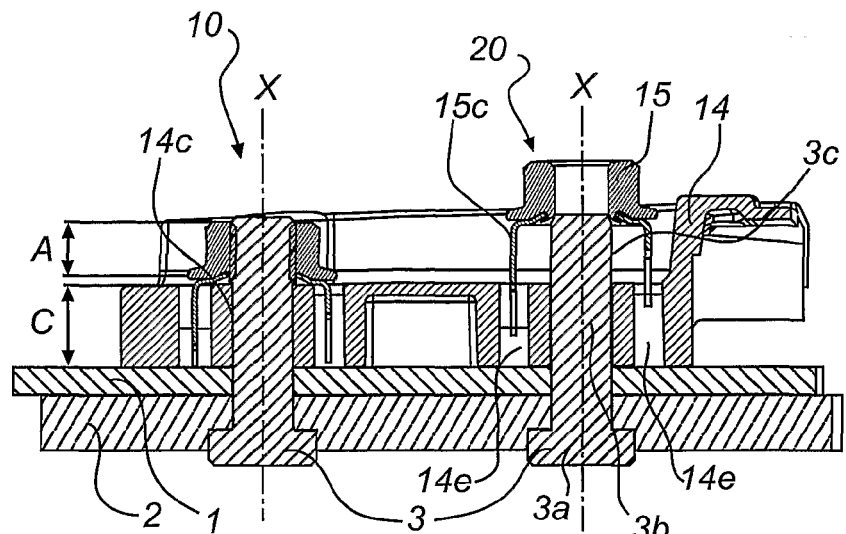
FIGS. 1 and 2 are cross sectional views of a part of a chain saw including a first embodiment of the present invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Two preferred embodiments of attaching arrangements for hand-held motor-driven tools will be described with reference to FIGS. 1-4. In these embodiments, the hand-held motor-driven tool is a chain saw having a body and a chain guiding bar that in a conventional manner supports and guides a saw chain in a peripheral groove of the bar. The saw chain is driven by a sprocket wheel, hidden under a cover portion. The body is provided with an engine that via a driving arrangement drives the sprocket wheel. The guide bar extends forwardly in the longitudinal direction of the chain saw, and the rearward end of the bar is clamped between the body and the cover portion by means of a tightening arrangement.

Figure 2:
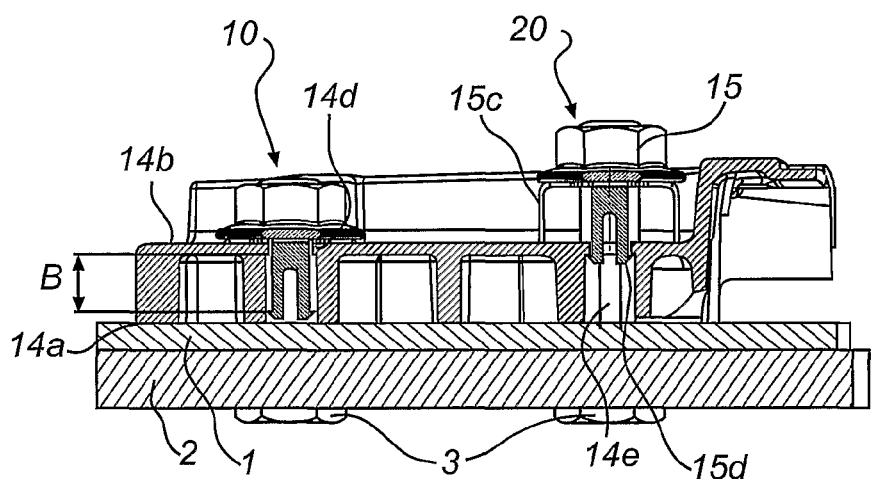
Figure 3:
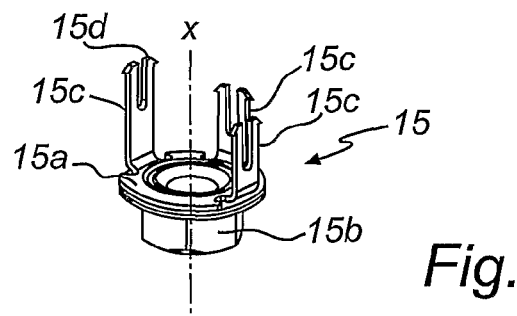
FIG. 3 is a perspective view of a nut according to the first embodiment of the present invention

A first embodiment of the present invention is shown in FIGS. 1-3. FIGS. 1 and 2 show a portion of a chain saw including the present invention. A cover portion 14 clamps a guide bar 1 to a body 2 by means of a tightening arrangement, comprising two joints 10, 20. Each joint includes a first 3 and a second 15 engagement means. The first engagement means 3 is a bolt and the second engagement means 15 is a nut.

Each bolt 3 has a first part 3a and a second part 3b. The first part 3a is securely attached to the body 2, e.g. by means of force fit, and the second part 3b extends from the body in a direction perpendicular to the guide bar plane and further through an aperture in the guide bar 1 and through an aperture 14c in the cover portion 14. The cover portion 14 has an inner surface 14a, directed towards the body 2, and an outer surface 14b, directed away from the body. A threaded part 3c of the second bolt part 3b, functioning as an engagement portion for engaging the nut to the bolt, projects at least partly beyond the outer surface 14b of the cover portion. In order to clamp the bar 1 between the cover portion 14 and the body 2, the nut 15 is engaged to the threaded part 3c of the bolt 3, and tightened.

The joint 20 in the right part of FIGS. 1 and 2 illustrates a condition when the nut 15 and the bolt 3 are not engaged but the nut is captively connected to the holder portion 14.

The joint 10 in the left part of FIGS. 1 and 2 illustrates a condition when the nut 3 and the bolt 15 are engaged and the nut 15 is tightened such that the joint clamps the bar 1 firmly between the body 2 and the cover portion 14.

In FIG. 2, reference A indicates a first distance, which is the length of thread engagement between the bolt 3 and the nut 15, i.e. the distance in the direction of a nut rotation axis X that the nut 15 has to move in thread engagement with the bolt 3 for firmly clamping the bar 1 between the body 2 and the cover portion 14. When the nut is not engaged to the bolt, the nut can move a second distance B relative the cover portion 14, in the direction of the nut rotation axis X. In FIG. 2, this second distance B is equal to the distance in the direction of the nut rotation axis X between the position of the nut 15 in the left part of the figure and the position of the nut 15 in the right part of the figure. The second distance B is equal to or greater than the first distance A, for allowing the nuts 15 to be loosened separately and independently of each other when detaching the cover from the body.

The nut 15 comprises a hollow and internally threaded body portion 15b, which is rotatably attached to a holder portion 15a, as shown in FIG. 3. The body portion 15b is rotatable compared to the holder portion 15a around the nut rotation axis X.

The holder portion 15a comprises a substantially circular portion that bears against the body portion 15b, and three attaching portions 15c, formed as legs, extending from the periphery of the substantially circular portion. The legs 15c are flat and directed away from the body portion 15b in a direction substantially parallel to the nut rotation axis X.

For each leg 15c a slot extends from an end of each leg distal to the body portion in a direction towards the body portion 15b to a point between the distal end of the leg 15c and the substantially circular portion of the holder portion 15a, such that the slot partly divides each leg 15c into two parallel parts. Each parallel part has a protruding portion 15d, shaped as a hook, in the distal end.

The cover portion 14 has oblong recesses 14e for receiving the legs 15c of the nut holder portion 15a. There is one separate recess 14e for each leg 15c. The recesses 14e are arranged separately from the through aperture 14c of the cover portion, which aperture 14c is arranged for receiving the bolt 3. The outer surface 14b of the cover portion 14 has protruding portions 14d arranged to co-operate with the hooks 15d of the nut holder portion legs 15c. The distance between these protruding portions 14d make the width of an opening of the recess 14e smaller than the width of the nut holder portion leg 15c at the position of the hooks 15d, such that the holder portion legs 15c are captivated within the recess 14e. The depth of each recess 14e is equal to or larger than the length of a holder portion leg 14c. The recesses 14e may according to an alternative embodiment extend from the outer surface 14a to the inner surface 14b of the body, e.g. the recesses may be through apertures.

The slots of each leg 15c make the structure of the nut holder portion legs 15c resilient. The outer ends of the two parallel parts can be pressed towards each other so that it is possible to snap the legs into the openings of the recesses 14e in the cover portion. Once inserted into the recesses, the legs 15c will revert to their original shape. The legs 15c allow the nut 15 to move relative the cover portion 14 in a direction of the rotational axis X of the nut. When the hooks 15d of the legs reaches the protruding portions 14d of the cover portion 14, the protruding portions 14d will co-operate with the hooks 15d such that the movement of the nut 15 is stopped. In this way, the nut 15 is captively attached to the cover portion 14. In FIGS. 1-3, the nut holder portion 15a has three legs 15c and there are three recesses 14e in the cover portion 14 for receiving the legs 15c. The number of legs 15c and corresponding recesses 14e may also be one, two, four or more.

The cross section in FIG. 1 is taken along a plane that intersects the centres of the bolts 3. The cross section in FIG. 2 is taken along a plane that is parallel to the cross section plane in FIG. 1 and that intersects a leg 15c of the nut holder portion 15a.

If an operator of a tool would like to e.g. change bars 1 using the arrangement described in FIGS. 1-3, the operator starts by loosening the nuts 15. Thanks to the second distance B being larger than the first distance A, the length of thread engagement, the nuts 15 can be unscrewed and loosened one at a time. When the nuts are loose, the cover 14 including the nuts 15 captively arranged in the cover is removed from the chain saw. Thereafter, the operator removes the old bar 1 from the body 2 and the bolts 3 of the tightening arrangement, and arranges a new bar 1 onto the bolts 3 such that the second part 3b of the bolts passes through the apertures of the new bar 1.

When the new bar 1 has been arranged onto the bolts 3, the cover portion 14 is arranged onto the bolts 3 by leading the bolts through the through apertures 14c of the cover portion. The through apertures 14c of the cover portion also function as a guiding means for guiding the cover portion 14 onto the bolts 3 such that the cover portion 14 comes into a correct position and such that the nuts 15 are arranged correctly towards the end of the second parts 3b of the bolts. In chain saw configurations having break components, such as a break band for a kick-back guard (not shown), mounted in the cover portion it is important to obtain high precision in the position of the cover portion 14. As the cover portion 14 is mounted onto the bolts 3 of body 2 the through aperture 14c of the cover portion 14 gets guidance from the second part 3b of the bolt 3. The diameters of the second part 3b of the bolt 3 and the through aperture 14c are preferably adapted to achieve a close fit and thereby a sufficient guidance in order to obtain a high precision in the position of the cover portion 4. According to the present embodiment the precision in the position of the cover portion 14 is even further improved by the relatively long contact area, defined by the distance C in FIG. 1.

Thanks to the nuts 15 being captively attached to the cover portion 14 in such a way that they are movable a second distance B relative the cover portion 14 in a direction of their rotation axis X, which second distance B is larger than the first distance A, the cover 14 can be arranged onto the bolts 3 such that the cover 14 can be pressed towards the bar 1 and the body 2 before the nuts 15 are tightened. This measure facilitates a correct arrangement of the bar between the cover and the body.

When the cover 14 has been arranged onto the bolts 3 and the bar 1 is clamped towards the body 2 by the cover 14, the nuts 15 are tightened by threadingly engaging the nuts 15 to the bolts 3.

Figure 4:
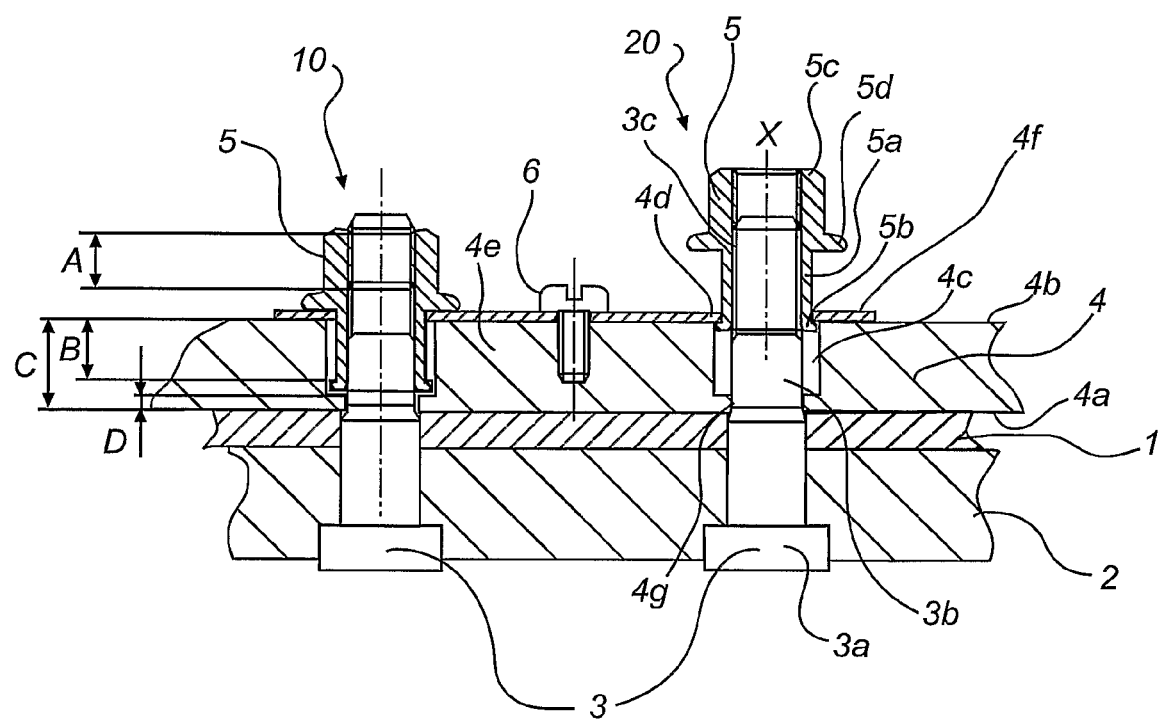
FIG. 4 is a cross sectional view of a second embodiment of the present invention.

An alternative embodiment of the present invention is shown in FIG. 4 wherein, as for the embodiment described with reference to FIGS. 1-3, a cover portion 4 clamps a guide bar 1 to a body 2 by means of a tightening arrangement, comprising two joints 10, 20. Each joint includes a first 3 and a second 5 engagement means. The first engagement means 3 is a bolt and the second engagement means 5 is a nut.

The Joint 10 in the left part of FIG. 4 shows a state when the nut 5 is engaged to the bolt 3 so that the bar 1 is firmly clamped between the cover portion 4 and the body 2. The Joint 20 in the right part of FIG. 4 illustrates a condition when the nut 5 and the bolt 3 are not engaged but the nut is captively connected to the cover portion 4.

In this second embodiment, the bolts 3 may be similar to the bolts described with reference to FIGS. 1-3. Each bolt has a first part 3a, securely attached to the body 2, and a second part 3b extending from the body through an aperture in the guide bar 1 and further through an aperture 4c, 4g in the cover portion 4. The cover portion 4 has an inner surface 4a, directed towards the body, and an outer surface 4b, directed away from the body.

In contrast to the embodiment described with reference to FIGS. 1-3, a plate 4f is attached to the outer surface 4b of the cover portion by means of a screw 6. The second part 3b of the bolt extends through an aperture in the plate 4f. A threaded part 3c of the second bolt part 3b projects beyond the plate 4f, in a direction away from the cover portion 4. In order to clamp the bar 1 between the cover portion 4 and the body 2, the nut 5 is engaged to the threaded part 3c of the bolt 3, and tightened.

The nut 5 comprises an internally threaded body portion 5c for engaging the threaded part 3c of the bolt. The internally threaded body portion is provided with a flange 5d that is adapted to bear against the plate 4f when the nut 5 is tightened. To allow axial movement of the nut 5 in a direction of the nut rotation axis X, the nut also comprises an attaching portion 5a, formed as a neck, adapted to be inserted into the through aperture 4c, 4g of the cover portion 4. The neck projects from the body portion in the direction of the nut rotation axis X from the flange 5d and away from the body portion 5c. The neck 5a has a protrusion, 5b formed as a flange arranged at the end distal to the flange 5d. The protrusion 5b is adapted to co-operate with at least one edge 4d of the aperture of the plate 4f, the at least one edge defining a diameter of the aperture in the plate 4f, so that the nut remains captively attached to the cover portion 4. A nut 5 arranged in this way could rather easily be manufactured with low tolerances.

The aperture 4c, 4g in the cover portion has two parts; an inner part 4g closest to the inner surface 4a of the cover portion 4, and an outer part 4c closest to the outer surface 4b of the cover portion 4. The diameter of the inner part 4g is smaller than the diameter of the outer part 4c. The outer part 4c is arranged as a recess in the aperture 4c, 4g. More specifically, the diameter of the inner part 4g is equal to or slightly larger than the diameter of the second part 3b of the bolt and the diameter of the outer part 4c is equal to or larger than the diameter of the protrusion 5b of the nut neck 5a. The outer part 4c of the aperture 4c, 4g has a larger diameter than the inner part 4g for being able to receive the nut neck 5a with its protrusion 5b.

The inner part 4g, according to present embodiment, also functions as a guide for the cover portion 4. In chain saw configurations having break components, such as a break band for a kick-back guard (not shown), mounted in the cover portion it is important to obtain high precision in the position of the cover portion 4. As the cover portion 4 is mounted onto the bolts 3 of body 2 the inner part 4g of the aperture 4c, 4g gets guidance from the second part 3b of the bolt 3. The diameters of the second part 3b of the bolt 3 and the inner part 4g of the aperture 4c, 4g are preferably adapted to achieve a close fit and thereby a sufficient guidance in order to obtain a high precision in the position of the cover portion 4.

The diameter of the aperture in the plate 4f is slightly smaller than the diameter of the outer part 4c of the through aperture 4c, 4g of the cover portion 4, such that the edge 4d of the plate 4f aperture partly covers the opening of the aperture 4c, 4g in the cover portion 4.

When the nut 5 is loosened such that its threaded part is not engaged to the threaded part 3c of the bolt, as illustrated by joint 20 in FIG. 4, the nut 5 is still connected to the cover portion 4 because the diameter of protrusion 5b is slightly larger than the diameter of the aperture in the plate 4f.

In FIG. 4, reference A indicates a first distance, which is the length of thread engagement between the bolt 3 and the nut 5, i.e. the distance in the direction of the nut rotation axis X that the nut 15 has to move in thread engagement with the bolt 3 for firmly clamping the bar 1 between the body 2 and the cover portion 14. When the nut is not engaged to the bolt, the nut is engaged to the cover portion 4 such that the nut can move a second distance B relative the cover portion 4, in the direction of the nut rotation axis X. In FIG. 4, this second distance B is equal to the distance in the direction of the nut rotation axis X between the position of the nut 5 of the joint 10 in the left part of the figure and the position of the nut 5 of the joint 20 in the right part of the figure. The second distance B is equal to or greater than the first distance A, for allowing the nuts 5 to be loosened separately and independently of each other. Reference C indicates the thickness of the cover portion 4, i.e. a distance between the outer surface 4b and inner surface 4a of the cover portion.

The walls of the inner part 4g of the through aperture will function as a guiding means for guiding the bolt 3 towards the nut 5 when the cover portion 4 is lead on to the bolt 3 such that the bar 1 is clamped between the cover portion 4 and the body 2. Reference D indicates a length of the inner part 4g of the through aperture 4c, 4g in the cover portion 4 in the direction of the nut rotation axis X functioning as a guiding means, i.e. a guiding length.

According to an embodiment, the aperture in the plate 4f may be oblong having a smallest diameter similar to the diameter between the edges 4d of the plate 4f and a largest diameter larger than the diameter of the nut neck 5a at the protrusions 5b. Thereby, when the plate 4f is not attached to the outer surface 4b of the cover portion 4, it is possible to insert the nut neck 5a through the aperture in the plate 4f where the aperture has a diameter similar to or broader than the diameter of the nut neck 5a at the protrusions 5b, by tilting the nut 5 relative the plate 4f, before inserting the nut neck through the aperture in the plate 4f. When the plate is attached to the cover portion by means of the screw 6 such that the plate bears against the outer surface 4b of the cover portion 4, and the nut neck 5a extends into the aperture 4c, 4g, the nut 5 can not be tilted and is thus captively attached to the cover portion.

In another embodiment, the aperture in the plate 4f may be circular having a diameter similar to the distance between the edges 4d of the plate. For making it possible to insert the nut neck 5a in the aperture of the plate 4f, the nut neck may have slots extending in the direction of the nut rotation axis X, the slots making the structure of the nut neck 5a resilient. Thus it will be possible to compress the nut neck 5a and to snap it through the aperture in the plate 4f. Once inserted, the nut neck 5a will revert to its original shape, and the nut 5 is captively connected to the plate 4f.

The plate 4f can be a separate plate or a part of an already existing part of the hand-held motor-driven tool, such as a spike or spike bumper of a chain saw.

Other embodiments of the present invention are also possible. For example, there could be only one bolt and one nut in the attaching arrangement.

Above, the tool is described as a chain saw. Although, the tool may be any kind of hand-held motor-driven tool in which a bar is clamped between a cover and a body, such as a hedge trimmer, clearing saw, trimmer, pole saw or a power cutter.

In the drawings and specification, there have been disclosed preferred embodiments and examples of the invention and, although specific terms are employed, they are used in a generic and descriptive sense only and not for the purpose of limitation, the scope of the invention being set forth herein.

The invention claimed is:

1. An arrangement for attaching a bar of a chain saw, to a body of the chain saw, the arrangement comprising:
    at least one first engagement device, having a first part, securely arranged to the body, and a second part extending from the body, the second part having an engagement portion for engaging at least one second engagement device;
    a cover portion adapted to bear against the bar such that the bar is arranged between the cover portion and the body;
    the at least one second engagement device, captively attached to the cover portion, wherein the second engagement device is adapted to engage the engagement portion of the first engagement device for securing a bar between the cover portion and the body, the second engagement device having a rotation axis;
    wherein the second engagement device is arranged to move a first distance along the engagement portion of the first engagement device, in a direction of the rotation axis of the second engagement device, for securing a bar between the cover portion and the body, when the first and second engagement device are not engaged, the second engagement device is captively attached to the cover portion in such a way that it is movable a second distance relative the cover portion in a direction of the rotation axis of the second engagement device, wherein the second distance is larger than the first distance,
    wherein the cover portion has an inner surface that, when the cover portion is arranged to the body, is directed towards the body, and an outer surface that, when the cover portion is arranged to the body, is directed away from the body, the cover portion further having a through aperture extending between the inner and outer surfaces for receiving the second part of the first engagement device, the cover portion further comprising at least one recess in which an attaching portion of the second engagement device is arranged for captively attaching the second engagement device to the cover portion and the at least one recess is arranged separately from the through aperture.

2. The arrangement according to claim 1, wherein the cover portion has guiding means for guiding the first engagement device towards the second engagement device.

3. The arrangement according to claim 1, wherein the second engagement device comprises a holder portion and an engagement portion, the engagement portion being rotatably attached to the holder portion.

4. The arrangement according to claim 3, wherein the holder portion of the second engagement device has at least one attaching portion extending away from the engagement portion substantially parallel to the rotation axis of the second engagement device, the at least one attaching portion extending into at least one recess of the cover portion for captively attaching the second engagement device to the cover portion.

5. The arrangement according to claim 4, wherein the at least one attaching portion has at least one protruding portion, the at least one protruding portion being arranged to cooperate with at least one protruding portion of the cover portion for captively attaching the second engagement device to the cover portion.

6. The arrangement according to claim 5, wherein the at least one protruding portion is arranged at an end of the attaching portion distal from the engagement portion.

7. The arrangement according to claim 4, wherein the at least one attaching portion of the second engagement device has a resilient structure.

8. The arrangement according to claim 7, wherein the resilient structure is realized by the at least one attaching portion being arranged as a leg, the leg being divided into two parts by a slot extending from an end of each leg distal to the engagement portion and projecting in a direction towards the engagement portion, each leg having a protruding portion for cooperating with the at least one protruding portion of the cover portion.

9. The arrangement according to claim 4, wherein the at least one attaching portion comprises at least three attaching portions cooperating with at least three separate recesses of the cover portion.

10. The arrangement according to claim 1, wherein the arrangement comprises at least two first engagement devices and at least two second engagement devices, each of the at least two second engagement devices being arranged to cooperate with a respective one of the at least two first engagement devices.

11. The arrangement according to claim 1, wherein the at least one first engagement device is a bolt and the at least one second engagement device is a nut arranged to cooperate with the bolt.

12. An arrangement for attaching a bar of a chain saw, to a body of the chain saw, the arrangement comprising:
    at least one first engagement device, having a first part, securely arranged to the body, and a second part extending from the body, the second part having an engagement portion for engaging at least one second engagement device;
    a cover portion adapted to bear against the bar such that the bar is arranged between the cover portion and the body;
    the at least one second engagement device, captively attached to the cover portion, wherein the second engagement device is adapted to engage the engagement portion of the first engagement device for securing a bar between the cover portion and the body, the second engagement device having a rotation axis;
    wherein the second engagement device is arranged to move a first distance along the engagement portion of the first engagement device, in a direction of the rotation axis of the second engagement device, for securing a bar between the cover portion and the body, when the first and second engagement device are not engaged, the second engagement device is captively attached to the cover portion in such a way that it is movable a second distance relative the cover portion in a direction of the rotation axis of the second engagement device, wherein the second distance is larger than the first distance,
    wherein the cover portion has an inner surface that, when the cover portion is arranged to the body, is directed towards the body, and an outer surface that, when the cover portion is arranged to the body, is directed away from the body, the cover portion further having a through aperture extending between the inner and outer surfaces for receiving the second part of the first engagement device, the cover portion further comprising at least one recess in which an attaching portion of the second engagement device is arranged for captively attaching the second engagement device to the cover portion, wherein at least a part of the through aperture has substantially the same cross-sectional dimension as a cross-sectional dimension of the first engagement device.

13. An arrangement for attaching a bar of a chain saw, to a body of the chain saw, the arrangement comprising:

at least one first engagement device, having a first part, securely arranged to the body, and a second part extending from the body, the second part having an engagement portion for engaging at least one second engagement device;

a cover portion adapted to bear against the bar such that the bar is arranged between the cover portion and the body;

the at least one second engagement device, captively attached to the cover portion, wherein the second engagement device is adapted to engage the engagement portion of the first engagement device for securing a bar between the cover portion and the body, the second engagement device having a rotation axis;

wherein the second engagement device is arranged to move a first distance along the engagement portion of the first engagement device, in a direction of the rotation axis of the second engagement device, for securing a bar between the cover portion and the body, when the first and second engagement device are not engaged, the second engagement device is captively attached to the cover portion in such a way that it is movable a second distance relative the cover portion in a direction of the rotation axis of the second engagement device, wherein the second distance is larger than the first distance, wherein the cover portion has an inner surface that, when the cover portion is arranged to the body, is directed towards the body, and an outer surface that, when the cover portion is arranged to the body, is directed away from the body, the cover portion further having a through aperture extending between the inner and outer surfaces for receiving the second part of the first engagement device, the cover portion further comprising at least one recess in which an attaching portion of the second engagement device is arranged for captively attaching the second engagement device to the cover portion, wherein the at least one recess for captively attaching the second engagement device to the cover portion is a part of the through aperture, which through aperture is arranged for receiving the first engagement device, wherein the recess is an outer part of the through aperture extending from the outer surface of the cover portion in a direction towards the inner surface and wherein the recess has a diameter larger than a diameter of an inner part of the aperture.

14. The arrangement according to claim 13, wherein the attaching portion of the second engagement device comprises a protrusion extending in a direction away from the rotation axis of the second engagement device, and the cover portion comprises a protrusion extending in a direction towards the rotation axis of the second engagement device, said protrusions being arranged to cooperate such that the second engagement device is captively attached to the cover portion.

15. An arrangement for attaching a bar of a chain saw, to a body of the chain saw, the arrangement comprising:

at least one first engagement device, having a first part, securely arranged to the body, and a second part extending from the body, the second part having an engagement portion for engaging at least one second engagement device;

a cover portion adapted to bear against the bar such that the bar is arranged between the cover portion and the body;

the at least one second engagement device, captively attached to the cover portion, wherein the second engagement device is adapted to engage the engagement portion of the first engagement device for securing a bar between the cover portion and the body, the second engagement device having a rotation axis;

wherein the second engagement device is arranged to move a first distance along the engagement portion of the first engagement device, in a direction of the rotation axis of the second engagement device, for securing a bar between the cover portion and the body, when the first and second engagement device are not engaged, the second engagement device is captively attached to the cover portion in such a way that it is movable a second distance relative the cover portion in a direction of the rotation axis of the second engagement device, wherein the second distance is larger than the first distance, wherein the cover portion has an inner surface that, when the cover portion is arranged to the body, is directed towards the body, and an outer surface that, when the cover portion is arranged to the body, is directed away from the body, the cover portion further having a through aperture extending between the inner and outer surfaces for receiving the second part of the first engagement device, the cover portion further comprising at least one recess in which an attaching portion of the second engagement device is arranged for captively attaching the second engagement device to the cover portion, wherein the at least one recess for captively attaching the second engagement device to the cover portion is a part of the through aperture, which through aperture is arranged for receiving the first engagement device, wherein the cover portion has a base portion and a plate portion, wherein the plate portion is attached to the base portion by means of an attachment device, and wherein the protrusion of the cover portion is part of the plate portion.

16. A handheld motor driven chain saw having a body and a bar, the handheld motor driven chain saw comprising:

at least one first engagement device, having a first part, securely arranged to the body, and a second part extending from the body, the second part having an engagement portion for engaging a second engagement device;

a cover portion adapted to bear against the bar such that the bar is arranged between the cover portion and the body;

at least one second engagement device, captively attached to the cover portion, wherein the second engagement device is adapted to engage the engagement portion of the first engagement device for securing a bar between the cover portion and the body, the second engagement device having a rotation axis;

wherein the second engagement device is arranged to move a first distance along the engagement portion of the first engagement device, in a direction of the rotation axis of the second engagement device, for securing a bar between the cover portion and the body, when the first and second engagement device are not engaged, the second engagement device is captively attached to the cover portion in such a way that it is movable a second distance relative the cover portion in a direction of the rotation axis of the second engagement device, wherein the second distance is larger than the first distance, wherein the cover portion has an inner surface that, when the cover portion is arranged to the body, is directed towards the body, and an outer surface that, when the cover portion is arranged to the body, is directed away from the body, the cover portion further having a through aperture extending between the inner and outer surfaces for receiving the second part of the first engagement device, the cover portion further comprising at least one recess in which an attaching portion of the second engagement device is arranged for captively attaching the second engagement device to the cover portion and the at least one recess is arranged separately from the through aperture.

* * * * *